United States Patent
Brunet et al.

(10) Patent No.: US 8,059,334 B2
(45) Date of Patent: Nov. 15, 2011

(54) OPTICAL FIBER AMPLIFIER SYSTEM AND METHOD

(75) Inventors: François Brunet, Québec (CA); Pascal Deladurantaye, St-Joseph de la Pointe-Lévy (CA); Yves Taillon, Saint-Augustin-de-Desmaures (CA)

(73) Assignee: Institut National d'Optique, Sainte Foy, Québec (CA)

( * ) Notice: Subject to any disclaimer, the term of this patent is extended or adjusted under 35 U.S.C. 154(b) by 385 days.

(21) Appl. No.: 12/355,058

(22) Filed: Jan. 16, 2009

(65) Prior Publication Data

US 2009/0122392 A1    May 14, 2009

Related U.S. Application Data

(63) Continuation-in-part of application No. 11/145,296, filed on Jun. 6, 2005, now abandoned.

(51) Int. Cl.
*H04B 10/17*    (2006.01)

(52) U.S. Cl. ............... 359/341.33; 359/341.1; 359/341.5

(58) Field of Classification Search ............... 359/341.1, 359/341.33, 341.5
See application file for complete search history.

(56) References Cited

U.S. PATENT DOCUMENTS 5,933,271 A * 8/1999 Waarts et al. ............ 359/341.31

* cited by examiner

*Primary Examiner* — Eric Bolda
(74) *Attorney, Agent, or Firm* — Norton Rose OR LLP

(57) ABSTRACT

An optical fiber amplifier system is described and comprises a first optical fiber having a doped core with a first gain spectral profile upon being pumped. The first optical fiber is adapted to receive an optical signal from a light source. A second optical fiber has a doped core with a second gain spectral profile upon being pumped. The second optical fiber is optically coupled to the first optical fiber. A continuous wave pump light system is optically coupled to the fibers so as to store energy in the fibers for a subsequent amplification of the optical signal from the light source. An overlapping configuration is provided between the first gain spectral profile and the second gain spectral profile so as to reduce energy depletion in one of the optical fibers from amplification of spontaneous emission generated by another of the optical fibers.

5 Claims, 2 Drawing Sheets

OPTICAL FIBER AMPLIFIER SYSTEM AND METHOD

CROSS-REFERENCE TO RELATED APPLICATIONS

This application is a continuation-in-part of U.S. patent application Ser. No. 11/145,296 filed Jun. 6, 2005 now abandoned, now pending; the specification of which is hereby incorporated by reference.

TECHNICAL FIELD

The present disclosure relates to the field of optical fiber amplifiers for amplifying optical signals.

BACKGROUND OF THE ART

Multi-stages fiber amplifiers typically involve rare-earth doped optical fiber amplifiers optically coupled in series (i.e., cascaded fiber amplifiers). When coupled to a cascaded fiber amplifier system, an optical signal, such as, for example, a pulsed seed laser, can be amplified. A pulsed seed laser refers to a laser having an emission state that periodically changes from an on state (radiation emission) to an off state (no radiation emission). This periodic modulation of the seed laser may be accomplished by switching the power supply of the laser itself, or by using an external switch placed at its output. In the above-referenced design of cascaded fiber amplifiers, when the seed laser is in the on state, its power radiation is amplified at least by two fiber amplifiers. Those fiber amplifiers are usually designed such that the pulse energy is maximized at the device output.

A fiber amplifier is typically made of an optical fiber having a rare-earth doped core. A particular gain spectrum is associated to each type of rare-earth ions (also called dopant). In order to amplify light guided in the fiber core, rare-earth ions have to be in an excited state of energy. This energy is usually provided by the absorption of continuous wave laser pump light guided in the fiber core or cladding.

When the seed laser is in the off state, no signal light is incoming in the first amplifier doped core. Rare-earth ions in the amplifier cascade absorb the continuous wave pump light without amplifying the seed radiation. As a consequence, the potential gain of the amplifiers increases, and so does the energy stored in the fiber amplifiers. When the seed laser is switched on again, part of this stored energy is transferred to the traveling pulse by stimulated emission.

Rare-earth ions in an excited state spontaneously emit a photon within an average time span called the fluorescence lifetime. Even when an amplifier is not seeded by the master oscillator, spontaneously emitted photons are guided in the amplifier core and are amplified by neighboring rare-earth ions still in the excited state. The resulting light guided in the fiber core is called amplified spontaneous emission (ASE). The immediate consequence of ASE is the depletion of available energy in the doped fiber. When many amplifiers are used in series, ASE emitted by one amplifier may act as a seed and furthers depletion of stored energy in the other amplifiers as well.

In U.S. Pat. No. 5,933,271, Waarts et al. propose a solution to reduce the energy depletion in the first amplifier from ASE generated in the second amplifier by using pulsed pumping and synchronization. However, this solution complicates the amplifier configuration compared to continuous wave pumping.

SUMMARY

It is therefore an aim of the present invention to provide a fiber amplifier system that addresses issues of the prior art.

It is a further aim of the present invention to provide a method for amplifying an optical signal.

Therefore, according to one aspect, there is provided a multi-stage optical fiber amplifier system for amplifying an optical signal. The optical fiber amplifier system comprises a first single-pass optical fiber amplification stage having a first optical fiber with a core doped with a first rare-earth ion and with a first gain spectral profile upon being pumped. The first optical fiber amplification stage is adapted to receive the optical signal. The optical fiber amplifier system also comprises a second single-pass optical fiber amplification stage having a second optical fiber with a core doped with a second rare-earth ion and with a second gain spectral profile upon being pumped. The second optical fiber is optically coupled to the first optical fiber for the optical signal amplified in the first optical fiber and the amplified spontaneous emission generated in the first optical fiber to be coupled to the second optical fiber. The optical fiber amplification stages have a continuous wave pump light system optically coupled to the fibers to pump the first optical fiber and the second optical fiber with continuous wave pump light so as to store energy in the fibers for a subsequent amplification of the optical signal from the light source. The first and the second rare-earth ion are different, such that the first gain spectral profile and the second gain spectral profile are distinct while overlapping over a wavelength region including the optical signal wavelength so as to reduce energy depletion in the second optical fiber from amplified spontaneous emission when the amplified spontaneous emission generated by the first optical fiber is coupled to the second optical fiber. One of the first rare-earth ion and the second rare-earth ion is neodymium and the other one is ytterbium.

This provides reduction of energy depletion in one optical fiber from amplified spontaneous emission generated in the other optical fiber, while still using a continuous wave pumping configuration. Continuous wave pumping is suitable for amplifying pulsed optical signals as well as continuous wave and modulated optical signals.

The present disclosure also provides the core of the first optical fiber doped with neodymium and the core of the second optical fiber doped with ytterbium.

The present disclosure also provides the pump light system with a first pump light source optically coupled to the first optical fiber and a second pump light source optically coupled to the second optical fiber.

The present disclosure also provides a method for amplifying an optical signal from a light source coupled to an optical fiber amplifier system having at least cascaded two optical fibers, comprising the steps of: i) obtaining a first gain spectral profile corresponding to one of the optical fibers; ii) obtaining a second gain spectral profile corresponding to another of the optical fibers and associated to the first gain spectral profile so as to reduce energy depletion in one of the optical fibers from amplification of spontaneous emission generated by another of the optical fibers; and iii) emitting an optical signal in the optical fiber amplifier system; whereby the optical signal is amplified.

BRIEF DESCRIPTION OF THE DRAWINGS

Having thus generally described the nature of the invention, reference will now be made to the accompanying drawings, showing by way of illustration a preferred embodiment thereof and in which.

DESCRIPTION OF THE PREFERRED EMBODIMENTS

Figure 1:
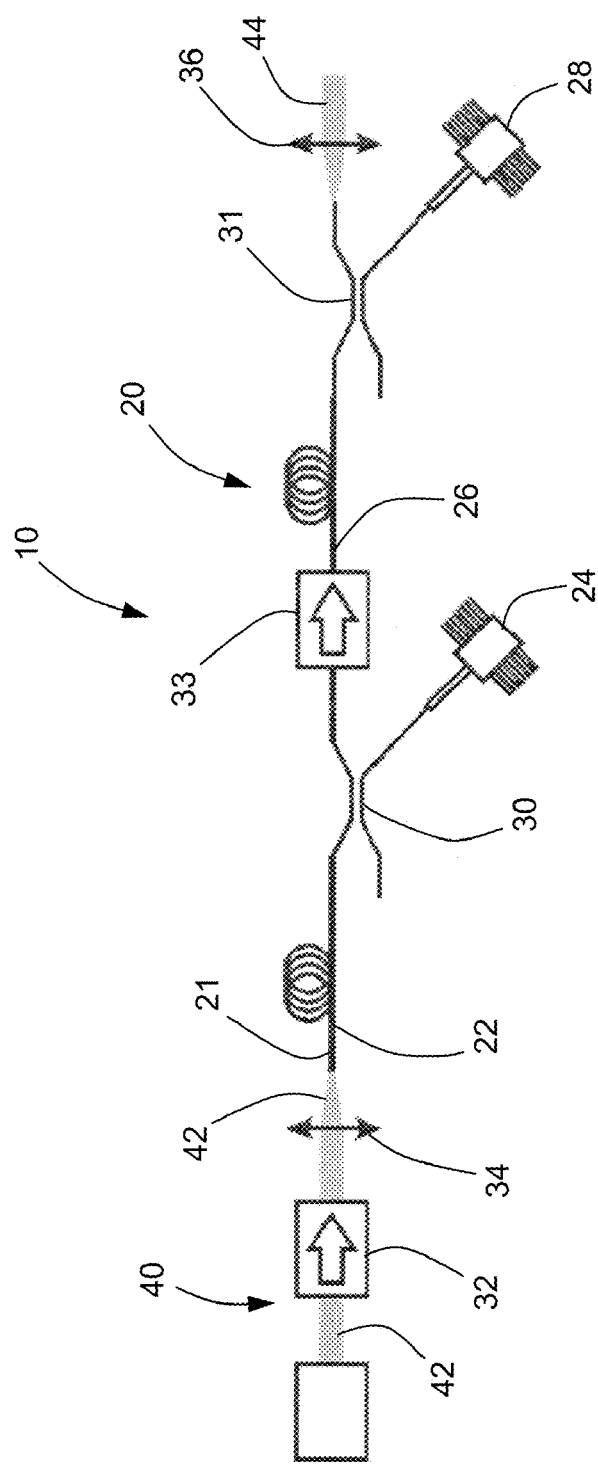
FIG. 1 is schematic view of an optical fiber amplifier system, in accordance with a first embodiment of the present invention, to which is optically coupled a light source.

Referring now to FIG. 1, an optical system 10, in accordance with a first embodiment the present invention, having a light source 40 (e.g., seed laser) optically coupled to a cascaded optical fiber amplifier system 20, will be described.

The optical fiber amplifier system 20 has a first amplifier 22 and a second amplifier 26. The first amplifier 22 and the second amplifier 26 are optically coupled (i.e., coupled for light transmission therebetween) by way of a coupler 30 and an isolator 33. The first amplifier 22 and the second amplifier 26 are optical fibers having respective rare-earth doped cores. The dopant used in the cores of the amplifiers 22 and 26 will be described in further detail hereinafter. The coupler 30 is used to couple the fiber core of the first amplifier 22 to the fiber core of the second amplifier 26. Moreover, the coupler 30 couples pump light coming from a continuous wave pump source 24, typically a laser diode, to the fiber of the first amplifier 22, in order to store energy in the first amplifier 22 for subsequent amplification of a signal from the light source 40.

Similarly, a coupler 31 is used to couple the fiber core of the second amplifier 26 to output optics 36. The coupler 31 is also used to couple pump light coming from a continuous wave pump source 28, typically a laser diode, to the fiber of the second amplifier 26, in order to store energy in the second amplifier 26 for subsequent amplification of a signal from the light source 40.

The light source 40 has an isolator 32 and focusing optics 34, through which light beam 42 from the light source 40 will propagate to enter into the optical fiber amplifier system 20 via the input end 21 of the first amplifier 22. Focusing optics 34 are used to adapt the light beam 42 so that the light beam 42, when entering the input end 21 of the first amplifier 22, has proper dimension. The isolators 32 and 33 are used to reduce back-and-forth reflections in the system 10.

In the system 10, light beam 42 propagates into the first amplifier 22, and, as it does, is amplified to a first intensity level. Light beam 42 then propagates through the coupler 30, through the isolator 33 and through the second amplifier 26, where it is amplified to a second intensity level, higher than the first intensity level. Then, the amplified laser beam propagates through the coupler 31 and through output optics 36, by which the amplified light signal is outputted from the system 10.

In one embodiment of the present invention, the light source 40 is a laser emitting at 1060 nm. The fiber amplifiers 22 and 26 of the system 20 are designed to provide gain at the laser wavelength, (i.e., at 1060 nm for the present embodiment). The fiber amplifiers 22 and 26 of the system 20 are designed to provide a spectral gain distribution, with an overlapping configuration between the spectral gain profiles of the two amplifiers 22 and 26, that minimizes the amplification by the second amplifier 26 of the spontaneous emission (SE) and the amplified spontaneous emission (ASE) produced by the first amplifier 22. One way to obtain such amplification characteristics is to dope differently the fiber amplifiers 22 and 26.

Accordingly, in one embodiment of the invention, the fibers of the first and second amplifiers 22 and 26 of the system 20 are doped with different dopants. For instance, the first amplifier 22 is an optical fiber with a silica core doped with neodymium (Nd). The second amplifier 26 is an optical fiber with a silica core doped with ytterbium (Yb).

Figure 2:
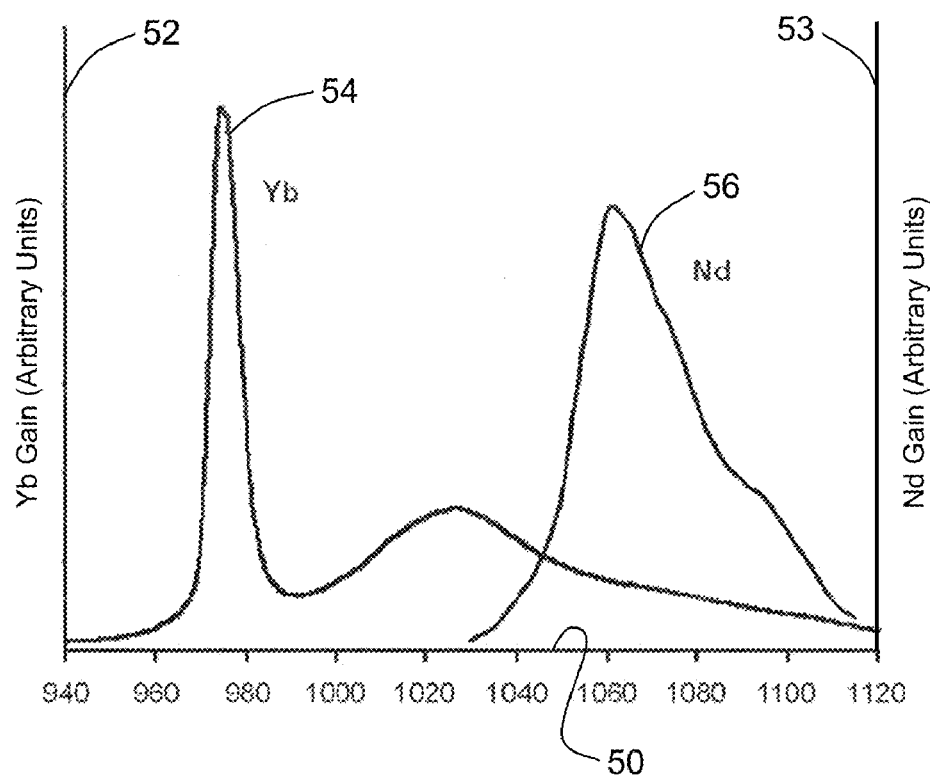
FIG. 2 is a graphic representation of gains of a Ytterbium (Yb) doped amplifier and of a Neodymium (Nd) doped amplifier, as a function of the wavelength, for one embodiment of the optical fiber amplifier system of FIG. 1.

FIG. 2 is a graphic representation of the gain, as a function of the wavelength, in each one of the fiber amplifiers 22 and 26, doped as described above. On the graphic representation of FIG. 2, the x axis 50 corresponds to the wavelength, whereas the first y axis 52 corresponds to the gain of the Yb-doped fiber amplifier in arbitrary units. Second y axis 53 corresponds to the gain of the Nb-doped fiber amplifier in arbitrary units. Curve 54 represents the spectral gain of the second fiber amplifier 26, doped with ytterbium (Yb), and curve 56 represents the spectral gain of the first amplifier 22, doped with neodymium (Nd). Although in reality the gain amplitude in the second amplifier 26 may differ from the gain amplitude of the first amplifier 22, curves 54 and 56 have been normalized to better show the interrelation between their respective shapes.

As someone skilled in the art knows, the spectral gain provided by a fiber amplifier depends on many factors, among which are the pump wavelength, the pump intensity delivered to the fiber amplifier, the intensity of the propagating signal aimed to be amplified, and the intensity of other propagating "noisy" signals (as, for example, spontaneous emission). Thus the spectral gain curves appearing in FIG. 2 are given as examples among many other examples, and it is understood that their relative shapes could vary depending on the operating conditions of the optical fiber amplifier system 20.

Nevertheless, FIG. 2 illustrates some of the advantages provided by the present invention. It is seen that gain curves 54 and 56 are overlapping in a wavelength region where a signal is aimed to be amplified. In the present embodiment, this wavelength region is located around 1060 nm, which is the wavelength of the light source 40. It is also seen that the wavelength region (1050 nm to 1080 nm) where the gain is maximum in the first amplifier 22 is separated from the wavelength region (970 nm to 980 nm) where the gain is maximum in the second amplifier 26. This will result in the minimized amplification by the second fiber amplifier 26 of any spontaneous emission generated by the first amplifier 22.

The spontaneous emission generated by an amplifier has a spectral profile similar to its spectral gain. Thus, by designing two amplifiers having distinct spectral gains but which are arranged in an overlapping configuration over a wavelength region corresponding to the signal aimed to be amplified, the amplification by the second fiber amplifier 26 of the spontaneous emission generated in the first amplifier 22 is minimized. The energy depletion of the second amplifier 26 due to the amplified spontaneous emission is reduced.

In the present embodiment, first and second amplifiers 22 and 26 are single-mode fibers, but the present invention could be embodied in other types of fibers, such as slightly multimode fibers or double-clad fibers, for example.

Many variations are contemplated for the system 10 described above. For example, the system 20 is shown in a pumping counter-propagating configuration but other pumping configurations (co-co, co and counter) could also be used. Other dopants could be used, provided the above-described gain overlapping configuration is present. Similarly, fiber material other than silica may be used and the pumping could be performed at other wavelengths. Also, the order of the first and second amplifiers 22 and 26 could be reversed. Furthermore, although the described embodiment presented a cascaded optical fiber amplifier system 20 comprising two amplifiers, the cascaded optical fiber amplifier system 20 could be provided with several cascaded amplifiers. All of the above variations are encompassed by the present description.

The invention claimed is:

1. A multi-stage optical fiber amplifier system for amplifying an optical signal, the optical fiber amplifier system comprising:
- a first single-pass optical fiber amplification stage having a first optical fiber with a core doped with a first rare-earth ion and with a first gain spectral profile upon being pumped, the first optical fiber amplification stage being adapted to receive said optical signal;
- a second single-pass optical fiber amplification stage having a second optical fiber with a core doped with a second rare-earth ion and with a second gain spectral profile upon being pumped, the second optical fiber being optically coupled to the first optical fiber for said optical signal amplified in said first optical fiber to be coupled to the second optical fiber;
- the optical fiber amplification stages having a continuous wave pump light system having a first continuous wave pump light source optically coupled to the first optical fiber and a second continuous wave pump light source optically coupled to the second optical fiber, so as to store energy in the fibers for a subsequent amplification of the optical signal; and
- wherein the first and the second rare-earth ion are different, such that the first gain spectral profile and the second gain spectral profile are distinct while overlapping over a wavelength region including the optical signal wavelength so as to reduce energy depletion in the second optical fiber from amplified spontaneous emission when said amplified spontaneous emission generated by the first optical fiber is coupled to the second optical fiber, and with one of the first rare-earth ion and the second rare-earth ion being neodymium and the other one being ytterbium.

2. The optical fiber amplifier system according to claim 1, wherein the doped core of the first optical fiber is doped with neodymium and the doped core of the second optical fiber is doped with ytterbium.

3. The optical fiber amplifier system according to claim 1, wherein the first pump light source is optically coupled to the first optical fiber for counter-propagation optical pumping of the first optical fiber.

4. The optical fiber amplifier system according to claim 1, wherein the second pump light source is optically coupled to the second optical fiber for counter-propagation optical pumping of the second optical fiber.

5. The optical fiber amplifier system according to claim 1, further comprising an optical isolator between the first optical fiber and the second optical fiber.

* * * * *